United States Patent [19]

Koch

[11] 3,908,725

[45] Sept. 30, 1975

[54] METHOD FOR PRODUCING PARALLEL LAMINATED PINE LUMBER FROM VENEER

[75] Inventor: Peter Koch, Alexandria, La.

[73] Assignee: The United States of America as represented by the Secretary of Agriculture, Washington, D.C.

[22] Filed: Feb. 1, 1974

[21] Appl. No.: 438,716

[52] U.S. Cl. .......... 144/317; 144/309 R; 144/309 L; 144/314 R; 144/315 R; 156/255; 156/335
[51] Int. Cl.² .......................................... B27D 1/04
[58] Field of Search ............ 144/309 R, 309 L, 313, 144/314 R, 315 R, 315 A, 316, 317, 209–215; 156/244, 255, 264, 335

[56] References Cited

UNITED STATES PATENTS

| | | | |
|---|---|---|---|
| 3,090,411 | 5/1963 | Juncker et al. | 144/309 R X |
| 3,242,025 | 3/1966 | Copp | 144/317 X |
| 3,384,137 | 5/1968 | Ash | 144/309 R |
| 3,677,884 | 7/1972 | Bornstein | 156/335 X |
| 3,681,168 | 8/1972 | Baker | 156/335 X |
| 3,686,061 | 8/1972 | Brown et al. | 144/317 X |
| 3,722,563 | 3/1973 | Schober | 144/317 |
| 3,812,893 | 5/1974 | Ervast | 144/326 R |

*Primary Examiner*—Harrison L. Hinson
*Assistant Examiner*—W. D. Bray
*Attorney, Agent, or Firm*—M. Howard Silverstein; Max D. Hensley

[57] ABSTRACT

A method for producing multi-ply, parallel-laminated pine lumber of 1½ inch thickness from one-quarter inch thick rotary peeled veneers.

The method is characterized by a carefully designed lay-up of plies whereby the butt-joints within individual plies are selectively located to achieve, overall, a rather precisely defined, staggered, butt-joint array with respect particularly to the butt-joints within immediately adjacent plies. Heat-setting phenol-formaldehyde type glues are employed to form three-ply sheets. Cold-setting phenol-resorcinol type glues are employed to form the ultimate ply slab from pairs of three-ply sheets. Lumber of selected width is then ripped from the ply slabs.

1 Claim, No Drawings

METHOD FOR PRODUCING PARALLEL LAMINATED PINE LUMBER FROM VENEER

A non-exclusive, irrevocable, royalty-free license in the invention herein described, throughout the world for all purposes of the United States Government, with the power to grant sub-licenses for such purposes, is hereby granted to the Government of the United States of America.

OBJECTIVES OF THE INVENTION

One objective of this invention is to increase the yield of lumber from each log. Another objective is to produce lumber of increased stiffness and bending strength and decreased crook. These objectives are accomplished by a planned distribution of wood defects throughout the several plies in such a manner that no defect will cause excessive weakening of the finished laminated lumber.

The method of the invention yields structural lumber one and one-half inches in thickness or multiples thereof which lumber is of exceptional strength and suitable for exterior use. The yield of lumber per cubic foot of log is extraordinarily large.

The method of this invention will provide an increase in the yield of dry, sized lumber per cubic foot of log from a value of about 40 percent with conventional resawmilling practice to about 60 percent with the method disclosed and claimed.

Another objective of the invention is the production of lumber from woods-run logs which lumber will have about 10 percent greater modulus of elasticity and about 100 percent greater allowable stress in bending than will lumber sawn from similar logs by conventional means.

A further object of this invention is the manufacture of lumber of virtually any length and width from logs of 4- to 8-foot length and diameters as small as 7 inches.

It has heretofore been proposed to continuously laminate veneer into structural lumber by means of moving belts with heat for adhesive curing provided by heat stored on veneer surfaces. It has also been proposed that the stored heat principle be utilized in a batch-press process. It has also been proposed that moving belt hot presses be used, or that multiple hot presses be used sequentially to cure phenolic adhesives in lumber laminated from veneer. The problem to which all of these proposals is addressed, is that of getting sufficient heat to inner gluelines of waterproof glue, to accomplish glue cure in some reasonable amount of time, e.g., less than 10 minutes of press time.

The method of this invention solves this problem by a primary pressing operation in a hot plate press in which three-ply panels only three-quarter inch thick are pressed from veneer one-quarter inch thick; by this method phenol-formaldehyde gluelines can be cured in a reasonable length of time (less than 10 minutes) since no glueline is more distant than one-fourth inch from the surface of the hot plates. In a secondary operation, pairs of these three-quarter inch thick panels are then batch-pressed into 1½ inch thick slabs using a phenol resorcinol adhesive that requires little heat to cure into a waterproof glueline. The resulting large slabs 1½ inch thick are then crosscut to desired lumber length and smooth-ripped to exact width desired; no further sizing is required.

It is within the purview of this method and it will be obvious to those skilled in the art to which this invention pertains, that multiple pairing and cold pressing of the three-quarter inch sheets or of the ply slabs will yield lumber of greater thickness than 1½ inch.

In general, the method of the invention is carried out by forming with hot pressing and employing a conventional phenolformaldehyde glue, three-ply, three-quarter inch thick panels. Pairs of the so formed panels are then cold pressed, this time employing a phenol-resorcinol cold-setting glue, into ply slabs or panels one and one-half inch in thickness.

Conventional equipment and techniques are entirely suitable for the operations of peeling, clipping and drying the one-quarter inch thick veneers.

For the purpose of carrying out the operations of hot-pressing to form the three-quarter inch thick, three-ply panels, glue applicators and phenolic adhesives identical to those presently used in the industry are suitable.

Many hot presses currently in use by the southern pine plywood industry have 32 openings with platens that measure 4 by 8 feet. Accordingly, the gluing of three one-quarter inch veneers into three-quarter inch laminates can be accomplished in a hot press of identical capacity but with eight openings having platens measuring 4 feet wide by 32 feet long.

The layup and charging mechanism for a 32 foot press must be specially designed to achieve the prescribed pattern of butt joints. Short sheets of veneer resulting from fishtails may diminish the distance between butt joints in adjacent plies from 17 inches where all 8-foot lengths are used to 12¾ inches for 6-foot lengths and 8½ for 4-foot lengths. However, the occasional insertion of a pair of 4-foot lengths, or four 6-foot lengths, does not significantly reduce either the modulus of elasticity (MOE) or the modulus of rupture (MOR).

Following the single hot press operation, single-opening cold presses are conveniently used. Each 1½ inch thick panel is comprised of a pair of three-quarter inch panels glued together with a single phenol-resorcinol glueline.

On discharge from the cold press, the six-ply panels pass through a cross-cutting saw to produce lumber lengths desired. The cross-cut panels are then smooth-ripped to yield lumber of net standard widths.

Moisture content of the lumber at this stage is typically five to 10 percent; preferably it should be as near nine percent as possible.

Preferred conditions for the operations involved in the practice of the method herein disclosed are set forth below.

Good results are obtained when the green logs are peeled after heating to 160° F., (but acceptable results can be obtained for many species peeled cold). Prior to the hot pressing operation veneer moisture content should be near four percent.

When the three-ply, three-quarter inch panels are assembled, the two gluelines should both be "loose-to-tight;" glue should be spread on the center veener at about 85 pounds per 1,000 square feet of double glueline if the species is southern pine (for Douglas-fir the spread can be 10 or 15 percent less). The glue used should be a phenol-formaldehyde formulation of the heat-setting, exterior type for plywood of the species. The glue formulated with about 26 percent resin solids. Open assembly time should be less than 18 minutes. Press temperature, pressure, and time should be about 285° F., 175 p.s.i., and 6½ minutes.

After discharge from the hot press, panel pairs to be batchpressed into 1½ inch thick panels should have matching faces spread on the loose side (to yield a loose-to-loose bond) with a total of about 75 pounds of phenol-resorcinol adhesive of the cold-setting, waterproof type (formulated for laminating) per 1,000 square feet of single glueline. With minimum open assembly time, these pairs of panels can conveniently be placed with other panel pairs to form a cold press charge and batch-pressed at slightly elevated temperature (above ambient) for about 8 hours (preferably longer, but some glue formulations will give adequate bonding in shorter times).

After cooling, the cold-pressed, six-ply panels are cross-cut and ripped preferably with thin-kerf, planer-type saws.

Yields of lumber and strength of lumber laminated from one-quarter inch southern pine veneer are tabulated in the body of the following example, which reflects the operations of the claimed method.

EXAMPLE

Twelve southern pine logs from 11 to 17 inches in butt diameter (inside bark) were randomly selected from the log pile of a commercial lumber company in such manner that a range of grades and sizes was as is represented in Table 1.

Each 17-foot stem section was crosscut to yield three 1-inch disks (taken from each end and at mid-length) for evaluation of specific gravity. The central disk was removed at such a point as to leave one peeler log and one sawlog, each about 8½ feet long. Large and small ends of original logs were randomly allocated. Ends of logs were marked to identify the matched pairs. All logs were graded according to USDA Forest Service rules.

One log from each of the twelve pairs was sawed, the other rotary peeled. Logs 1 and 2 were miscut in the sawmill and log 10 spun out in the veneer mill. Nine pairs thus were left for the comparative study. Of these 18 logs, 11 were graded No. 1, five were No. 2, and two were No. 3.

Specific gravity (green volume and ovendry weight), diameter, and number of rings were determined on the disks, and results averaged to yield data for each short log.

Log Data

Sawlogs averaged 1.6 in grade, 7.61 cubic feet in gross volume, and 0.51 in specific gravity. They measured 12.0 inches in diameter at the small end, with a large-end average of 13.6 inches. The veneer logs also were 12.0 inches in small-end diameter but averaged 13.0 inches at the large end, and they therefore had slightly less volume (7.18 cubic feet). Slightly lower specific gravity of the veneer logs (0.49) was offset by grade, which averaged slightly better (1.4) than that of the sawlogs. Since none of these differences proved statistically significant (0.05 level), the sawlogs and matched peeler logs were closely comparable (Table 1).

Table 1

Volume, grade, and density of matched sawlogs and veneer bolts, with yields of solid-sawn and laminated lumber

| Log number (1) | Volume | Specific gravity (2) | Log diameter(3) Small end | Log diameter(3) Large end | Rings per inch | Log grade (4) | Log scale (5) | Product yield(6) | | |
|---|---|---|---|---|---|---|---|---|---|---|
| | Cu. ft. | | In. | | | | Bd. ft. | Bd. ft.(7) | Cu. ft.(8) | Pct(9) |
| 3S | 9.52 | 0.50 | 12.5 | 16.4 | 3½ | 1 | 47 | 54.7 | 3.10 | 32.6 |
| 3V | 6.52 | .48 | 11.5 | 12.5 | 4 | 2 | 40 | 72.9 | 3.80 | 58.3 |
| 4S | 4.78 | .48 | 10.2 | 10.3 | 14 | 3 | 30 | 30.7 | 1.73 | 36.2 |
| 4V | 5.14 | .51 | 10.3 | 12.2 | 14 | 1 | 31 | 55.9 | 2.85 | 49.6 |
| 5S | 7.07 | .53 | 12.3 | 12.7 | 9 | 1 | 46 | 53.3 | 2.98 | 42.1 |
| 5V | 6.47 | .50 | 11.6 | 12.3 | 8½ | 2 | 41 | 74.3 | 3.93 | 60.8 |
| 6S | 5.68 | .53 | 11.1 | 11.3 | 10 | 1 | 36 | 48.0 | 2.54 | 44.8 |
| 6V | 6.33 | .54 | 11.3 | 12.3 | 10½ | 1 | 38 | 79.4 | 4.17 | 65.8 |
| 7S | 5.68 | .46 | 9.9 | 12.5 | 6 | 3 | 27 | 34.0 | 3.23 | 56.9 |
| 7V | 7.20 | .42 | 12.5 | 12.7 | 6 | 2 | 47 | 72.9 | 3.85 | 53.4 |
| 8S | 7.07 | .52 | 12.0 | 12.9 | 11 | 1 | 44 | 57.3 | 3.19 | 45.1 |
| 8V | 9.01 | .54 | 12.9 | 15.2 | 11½ | 1 | 52 | 89.9 | 4.71 | 52.3 |
| 9S | 9.02 | .55 | 13.2 | 15.0 | 12½ | 1 | 55 | 53.3 | 2.96 | 32.8 |
| 9V | 7.54 | .52 | 12.6 | 13.2 | 11 | 1 | 48 | 92.7 | 4.84 | 64.2 |
| 11S | 9.26 | .49 | 14.1 | 14.5 | 13 | 2 | 63 | 72.0 | 4.09 | 44.2 |
| 11V | 8.67 | .46 | 13.6 | 14.1 | 12½ | 2 | 58 | 111.9 | 5.91 | 68.1 |
| 12S | 10.43 | .52 | 13.0 | 17.3 | 4 | 1 | 52 | 65.3 | 3.65 | 35.0 |
| 12V | 7.15 | .48 | 12.1 | 13.0 | 4 | 1 | 45 | 87.1 | 4.57 | 63.9 |
| Avg. S | 7.61 | .51 | 12.0 | 13.6 | 9 | 1.6 | 44.4 | 52.1 | 3.05 | 41.1 |
| Avg. V | 7.18 | .49 | 12.0 | 13.0 | 9 | 1.4 | 44.4 | 81.9 | 4.29 | 59.6 |
| Avg. | 7.40 | .50 | 12.0 | 13.3 | 9 | 1.5 | 44.4 | 67.0 | 3.67 | 50.3 |

(1)Logs 3S and 3V, etc., were cut from the same 17½ foot log; suffix S means sawlog, V means veneer bolt. All sawlogs were trimmed to a length of 100 inches, and all veneer bolts to 102 inches; log cubic volumes are based on these lengths.
(2)Basis of green volume and ovendry weight; average for entire log.
(3)Inside bark.
(4)USDA Forest Service grades for sawlogs (Schroeder et al. 1968).
(5)International ¼ inch scale.
(6)Values for veneer bolts include the board foot and cubic foot volume from 2 by 4's cut from veneer cores.
(7)Lumber scale based on nominal sizes, e.g., 2 by 4 inches in 96-inch lengths for sawn lumber, and 102 inches for laminated lumber.
(8)Net cubic feet kiln-dry, end-trimmed, sized product (based on measured dimensions); sawn 2 by 4's were computed at 96-inch length and laminated 2 by 4's at 102-inch length.
(9)Percent of gross cubic log volume recovered as kiln-dry, end-trimmed, sized product (based on measured dimension of each board).

Procedure with Sawlogs

The logs were sawn on a band headrig (with chipping head) and band linebar resaw to yield studs and wider 8/4 lumber. 1-inch sideboards were removed if they could edge out to at least 3-inch width and 6-foot length. The 8/4 lumber was sawn about 1-13/16 inches thick and full nominal width. Planks and boards from each log were labelled to correspond with the log from which sawn, and then kiln-dried to 10 percent moisture content. After drying, planks and boards were planed to standard dimension (1½ or three-fourths inches thick by 3½, 5½, 7¼, 9¼, or 11¼ inches wide) and endtrimmed to standard length (6 feet and 8 feet only). Net cubic volume of the dry, planed, trimmed planks and boards recovered from each log was measured.

At this point, all of the 8/4 planks 8 feet long were remanufactured into S4S two by fours of standard dimension, i.e., two by sixes were planed back to two by four, two by eights were center-ripped and replaned into two by fours, two by tens were ripped and planed to yield two by fours plus a waste strip, and two by twelves were ripped and planed to yield three two by fours. Identity of these two by fours was maintained by log, and all were equilibrated at 72° F. and 50 percent relative humidity. After rejection of wood with wane or evidence of rot, 57 sawn two by fours were selected for evaluation of bending strength.

Procedure for Peeler Logs

Peeler logs were heated in water vats for about 5 hours, and then peeled on a commercial veneer lathe to yield one-quarter inch veneer (when dry) and 5¼ inch residual cores. The nine cores were sawn into 18 two by fours on the mill's equipment, and the identity of the pieces was maintained by log.

The veneer was color-coded by log, clipped in the greatest possible widths, and air-dried to 10 percent moisture content. All veneer was saved.

The dry veneer was then ripped to widths of 15⅛ inches, if possible, or to any multiples that would yield 15⅛ inches when aligned side by side. This width was selected because four 3½ inch widths can be ripped from it with minimum waste. Ripped veneers from each log assembled and glued with a conventional, heat-setting, exterior type glue (e.g., a phenol-formaldehyde glue) produce three-ply, three-quarter inch thick sheets in which sheets all of the interior glue bonds are tight to loose and the veneer butt joints in immediately adjacent layers are stagger-spaced over the distance range of about 8½ inches to about 17 inches.

Paired sheets of the three-ply, three-quarter inch thick sheets formed by hot-pressing as described above can then be joined via a cold-pressing operation using a cold-setting, waterproof type glue (e.g., a phenol-resorcinol glue) spread at about 75 pounds per thousand square feet of glueline, the glue bonds at the center line accomplished between the loose-to-loose veneer faces of the respective pair members to form slabs about 1½ inches in thickness.

The resulting slabs were double-end trimmed to 102 inches. Slab widths of 15⅛ inches afforded little waste when straight-line ripped with a planing saw to yield four two by fours, each 3½ inches wide. Total net cubic volumes of these two by fours (plus volume of remaining usable veneer pieces that would not make a full-width plank) were totalled for each log. On the assumption that the laminating process is capable of producing virtually endless lumber, the full 102 inch length was credited in volume computations.

The 92 laminated two by fours thus made were stored for 2 to 3 weeks at 72° F. and 50 percent relative humidity.

After equilibration, all two by fours, (sawn and from rotary-peeled veneer) were destructively evaluated for MOE, MOR, and proportional limit (PL) in edgewise bending. The two by fours were evaluated on a 90-inch span with two-point loading. Apparatus and speed of loading followed recommendations in ASTM D 198, Static Tests of Timbers. Deflections between supports were measured to the nearest 0.01 inch. Observed strength values of sawn and laminated two by fours were adjusted to 12 percent moisture content.

Following failure, one-inch, cross-sectional slices were removed from each end (near break) and oven-dried to determine moisture content and specific gravity (ovendry weight and volume). Values from each pair of slices were averaged for each two by four.

On average, lumber from the sawlogs scaled 117 percent of log scale (International one-fourth inch rule). 41 percent of the cubic volume ended as kiln-dry, end-trimmed, sized product (Table 1).

Yield from the peeler logs, including the two studs cut from each core, was significantly higher, with lumber scale 185 percent of log scale. Moreover, 60 percent of the cubic volume of each log ended as kiln-dry, end-trimmed, sized product. It is therefore evident that rotary-peeling and lamination yielded almost 50 percent more product than did sawing.

Specific gravity for the two by fours was as follows (basis of ovendry volume and weight):

| Source | Average | Std. dev. | Range |
|---|---|---|---|
| Laminated from veneer (incl. glue) | 0.62 | 0.050 | 0.53 – 0.72 |
| Sawn from cores | .52 | .072 | .44 – .67 |
| Sawn from sawlogs | .58 | .060 | .45 – .74 |

Since the laminated two by fours were made from outer wood and contained glue, it is logical that they had the highest specific gravity.

Results of the bending tests, with log averages, are given in Table 2. For all joists, stress at proportional limit and MOR were calculated from the standard flexure formula. MOE values were calculated from the deflection formula:

$$\Delta = (Pa/48EI)(3L^2 - 4a^2) + (3Pa/5GA)$$

where:
$\Delta$ is midspan deflection, inches
$P$ = total load on beam, pounds
$a$ = distance from support to load point, inches
$E$ = MOE, psi
$I$ = moment of inertia of cross section, inches
$L$ = span length, inches
$A$ = cross-sectional area, square inches
$G$ = modulus of rigidity or shear modulus, psi This formula accounts for deflections caused by both bending and shear stresses. The shear modulus (G) was assumed to equal one-sixteenth the MOE.

Strength properties of each stud were adjusted to 12 percent moisture content.

Table 2

Properties of 2 by 4's made from nine logs by three methods(1)

| Log number and method(1) | Pieces tested | Specific Gravity(2) | | | Modulus of rupture(3) | | | Proportional limit(3) | | | Modulus of elasticity(3)(4) | | |
|---|---|---|---|---|---|---|---|---|---|---|---|---|---|
| | | Avg. | Std. dev. | Range | Avg. | Std. dev. | Range | Avg. | Std. dev. | Range | Avg. | Std. dev. | Range |
| | Number | | | | P.s.i. | | | P.s.i. | | | P.s.i. × 10⁻³ | | |
| 3V | 8 | 0.62 | 0.018 | 0.59–0.64 | 7,970 | 1,185 | 6,070–9,180 | 4,620 | 252 | 4,290–4,990 | 1,500 | 101 | 1,280–1,590 |
| 3S | 7 | .58 | .029 | .51–.61 | 8,240 | 3,007 | 3,540–11,360 | 2,790 | 515 | 2,100–3,370 | 1,020 | 256 | 730–1,490 |

Table 2-continued

Properties of 2 by 4's made from nine logs by three methods(1)

| Log number and method(1) | Pieces tested | Specific Gravity(2) | | | Modulus of rupture(3) | | | Proportional limit(3) | | | Modulus of elasticity(3)(4) | | |
|---|---|---|---|---|---|---|---|---|---|---|---|---|---|
| | | Avg. | Std. dev. | Range | Avg. | Std. dev. | Range | Avg. | Std. dev. | Range | Avg. | Std. dev. | Range |
| 3C | 2 | .46 | — | — | 6,270 | — | — | 2,520 | — | — | 1,050 | — | — |
| 4V | 8 | .66 | .024 | .62–.68 | 10,220 | 889 | 8,960–11,420 | 5,990 | 627 | 5,110–6,790 | 2,230 | 64 | 2,140–2,300 |
| 4S | 4 | .53 | .049 | .47–.58 | 5,230 | 1,638 | 3,630–7,500 | 3,730 | 1,291 | 2,920–5,650 | 1,770 | 430 | 1,350–2,370 |
| 4C | 2 | .47 | — | — | 4,850 | — | — | 2,360 | — | — | 803 | — | — |
| 5V | 8 | .65 | .020 | .62–.68 | 9,210 | 970 | 7,810–10,050 | 5,890 | 589 | 5,200–6,790 | 2,130 | 84 | 1,980–2,240 |
| 5S | 8 | .59 | .056 | .50–.66 | 8,880 | 3,050 | 5,560–13,830 | 5,760 | 2,513 | 3,600–11,250 | 2,050 | 329 | 1,560–2,470 |
| 5C | 2 | .48 | — | — | 4,700 | — | — | 3,070 | — | — | 1,370 | — | — |
| 6V | 8 | .69 | .015 | .66–.71 | 9,900 | 1,097 | 8,450–11,880 | 6,790 | 440 | 6,120–7,440 | 2,510 | 64 | 2,380–2,600 |
| 6S | 6 | .61 | .033 | .57–.66 | 7,840 | 1,789 | 4,700–9,180 | 4,870 | 736 | 3,880–5,742 | 2,090 | 147 | 1,930–2,310 |
| 6C | 2 | .59 | — | — | 5,350 | — | — | 4,260 | — | — | 2,030 | — | — |
| 7V | 8 | .55 | .014 | .53–.57 | 6,740 | 871 | 5,670–8,030 | 4,480 | 554 | 3,650–5,300 | 1,420 | 48 | 1,320–1,480 |
| 7S | 4 | .46 | .010 | .47–.45 | 4,390 | 1,057 | 3,280–5,530 | 3,090 | 478 | 2,420–3,470 | 1,350 | 38 | 1,300–1,390 |
| 7C | 2 | .45 | — | — | 4,800 | — | — | 3,280 | — | — | 1,300 | — | — |
| 8V | 12 | .68 | .019 | .66–.72 | 12,410 | 769 | 10,790–13,950 | 6,860 | 725 | 6,100–8,030 | 2,500 | 93 | 2,350–2,670 |
| 8S | 9 | .60 | .015 | .58–.62 | 11,170 | 3,378 | 6,100–14,600 | 7,590 | 1,899 | 5,680–10,490 | 2,470 | 327 | 1,910–2,900 |
| 8C | 2 | .66 | — | — | 9,190 | — | — | 7,890 | — | — | 2,230 | — | — |
| 9V | 12 | .65 | .013 | .63–.68 | 9,830 | 1,264 | 7,670–12,480 | 5,240 | 972 | 4,120–6,720 | 2,060 | 141 | 1,790–2,350 |
| 9S | 4 | .70 | .037 | .66–.74 | 13,530 | 2,703 | 10,330–16,360 | 6,710 | 1,991 | 4,290–9,110 | 2,380 | 364 | 1,850–2,120 |
| 9C | 2 | .50 | — | — | 7,100 | — | — | 4,530 | — | — | 1,580 | — | — |
| 11V | 16 | .57 | .009 | .55–.58 | 9,350 | 639 | 8,440–10,370 | 4,910 | 526 | 4,230–6,030 | 1,790 | 48 | 1,670–1,870 |
| 11S | 6 | .54 | .019 | .53–.58 | 9,430 | 1,300 | 7,940–11,340 | 5,500 | 1,103 | 4,050–7,430 | 1,870 | 144 | 1,680–2,080 |
| 11C | 2 | .58 | — | — | 7,150 | — | — | 3,780 | — | — | 1,820 | — | — |
| 12V | 12 | .60 | .019 | .57–.64 | 7,300 | 833 | 6,290–9,410 | 4,340 | 411 | 3,710–5,130 | 1,510 | 91 | 1,390–1,710 |
| 12S | 9 | .60 | .027 | .55–.63 | 11,120 | 1,338 | 9,410–13,210 | 3,150 | 520 | 2,570–4,020 | 1,180 | 115 | 1,030–1,360 |
| 12C | 2 | .46 | — | — | 6,940 | — | — | 4,320 | — | — | 1,320 | — | — |

(1)Suffix V means laminated from rotary-peeled veneer; S means sawn from sawlogs; C means sawn from veneer cores. Since only two pieces were sawn from each veneer core, no standard deviations or ranges are tabulated for lumber from cores.
(2)Basis of ovendry volume and weight; specific gravity of laminated lumber includes weight of glue.
(3)Adjusted to 12-percent moisture content.
(4)Corrected for shear.

Table 3

Summary of results of bending tests of 167 kiln-dry[1] 2 by 4's

| Property and parameter | Laminated from rotary peeled veneer[2] | Sawn from veneer cores | Sawn from sawlogs[4] |
|---|---|---|---|
| | P.s.i. | | |
| Modulus of rupture | | | |
| Average | 9,310 | 6,260 | 9,220 |
| Standard deviation | 1,867 | 1,771 | 3,274 |
| 95% exclusion limit[5] | 5,576 | 1,916 | 2,672 |
| Range | 5,670–13,950 | 2,890–10,540 | 3,280–16,360 |
| Proportional limit | | | |
| Average | 5,410 | 4,000 | 4,890 |
| Standard deviation | 1,081 | 1,782 | 2,183 |
| 95% exclusion limit[5] | 3,248 | 0 | 524 |
| Range | 3,650–8,030 | 2,300–9,650 | 2,100–11,250 |
| Modulus of elasticity[6] | | | |
| Average | 1,950,000 | 1,500,000 | 1,790,000 |
| Standard deviation | 399,000 | 461,000 | 571,000 |
| 95% exclusion limit[5] | 1,152,000 | 369,000 | 648,000 |
| Range | 1,280,000– | 730,000– | 730,000– |

Table 3-continued

Summary of results of bending tests of 167 kiln-dry[1] 2 by 4's

| Property and parameter | Laminated from rotary peeled veneer[2] | Sawn from veneer cores | Sawn from sawlogs[4] |
|---|---|---|---|
| | P.s.i. | | |
| | 2,670,000 | 2,450,000 | 2,900,000 |

[1]All strength values adjusted to 12 percent moisture content.
[2]92 pieces tested; average specific gravity was 0.62 (basis of ovendry vol. and wt.).
[3]18 pieces tested; average specific gravity was 0.52 (basis of ovendry vol. and wt.).
[4]57 pieces tested; average specific gravity was 0.58 (basis of ovendry vol. and wt.).
[5]Based on procedure of Natrella (1963).
[6]Corrected for shear.

In general, the sawn two by fours failed in tension at knots or in regions of grain deviation. The laminates also generally failed in tension; the failures were generally traceable to a butt joint. None failed in horizontal shear.

Bending properties varied significantly (.05 level) among the three classes of two by fours tested (Table 3). The laminated two by fours not only averaged stronger and stiffer than the sawn, but they also had less variation. Lumber sawn from the cores was weaker than that cut from sawlogs but had less variation.

From Table 3, the following comparisons can be made of average values.

| Source of joist | MOR | MOE Corrected for shear | MOE Not corrected for shear |
|---|---|---|---|
| | Psi | Psi | |
| Laminated | 9,310 | 1,950,000 | 1,910,000 |
| Sawn from sawlogs | 9,220 | 1,790,000 | 1,750,000 |
| Sawn from cores | 6,260 | 1,500,000 | 1,470,000 |

The joists laminated from veneer had an average MOE equaling or exceeding the values published (Southern Pine Inspection Bureau 1970, pp. 64, 65) for all southern pine structural grades except "Dense select structural" and "No. 1 dense," which are given at 2,000,000 psi. MOE for the two by fours from sawlogs was close to the species average (one million seven hundred and fifty thousand psi) commonly accepted for loblolly pine; probably most of the logs were from loblolly pine trees. The two by fours from cores had an MOE (one million five hundred thousand psi) about equal to that called for SPIB rules applicable to studs (one million four hundred thousand psi).

Interpretation of MOR values must take into account their variability, which is a factor in the establishment of allowable working stresses.

A recognized allowable bending stress of a specific population of joists can be calculated by breaking a random sample, computing the 95 percent exclusion limit for MOR, and multiplying this value by 0.476. This factor is the product of three components: 9/16 for duration of load, 11/10 for normal loading, and 10/13 for factor of safety.

A conservative procedure for establishing the 95 percent exclusion limit of a population (assuming normality of distribution) requires the use of the tabulated K for one-sided statistical tolerance limits as given, for example, in Table A-7 of Natrella (Natrella, M. G. 1963. "Experimental Statistics," U.S. Dept. of Commerce National Bureau of Standards Handbook 91). By this procedure, the probability is 95 percent that at least 95 percent of the MOR values in the distribution from which the sample was drawn will exceed the average MOR less K times the standard deviation, namely, $\bar{x} - Ks$. From Table 3, $\bar{x} = 9,310$ psi for MOR of laminated two by fours, and the standard deviation (s) is 1,867 psi. The appropriate $K$ (for $n = 92$) is 2.0. The lower 5-percent exclusion limit for MOR is therefore 5,576 psi, with an associated probability of 95 percent.

Application of this procedure to the two by fours laminated from veneer resulted in an allowable bending stress of 2,660 psi, that is, 5,576/2.1. The significance of this value is apparent when one notes that the allowable bending stress, i.e., extreme fiber stress in bending, for the strongest structural grade of southern pine is 2,650 psi (Southern Pine Inspection Bureau 1970, p. 64).

Similar computations for the other two classes of two by fours yielded the following comparison:

| Source of lumber | K value from Natrella (1963) | Allowable fiber stress in bending |
|---|---|---|
| | | Psi |
| Laminated from veneer | 2.0 | 2,660 |
| Sawn from sawlogs | 2.0 | 1,270 |
| Sawn from veneer cores | 2.453 | 910 |

The value of 1.270 psi for allowable fiber stress in bending of lumber from sawlogs is about equal to that given by the Southern Pine Inspection Bureau for No. 2 Common (1,300 psi). That tabulated for two by fours sawn from veneer cores is slightly higher than the SPIB value for Stud gate (875 psi).

I claim:

1. A method for producing parallel, laminated lumber from one-quarter-inch thick pine veneer, which method consists of the following steps carried out in sequence:
   a. peeling pine logs to produce veneer one-quarter of an inch thick, which veneers exhibit an upper or tight side and a lower or loose side as a consequence of the veneer side location relative to the veneer peeler knife edge, the tight side being that side distal the knife edge, the loose side being that side proximal the knife edge;
   b. clipping the veneers of step (a) to produce veneer sheets of standard width appropriate for a preselected glue press;
   c. drying the clipped veneer sheets of step (b) to a moisture content of about from 4 to 6 percent;
   d. composing and clipping the dried veneer sheets of step (c) into widths which widths will of themselves or with other widths yield a composite one-quarter-inch thick veneer sheet of a width dimension compatible with said preselected glue press;
   e. laying up and gluing with a heat-setting, exterior type glue, three of the one-quarter inch thick veneer sheets of step (d) to produce a ply slab of length dimension compatible with said preselected glue press, the laying-up and gluing step being carried out in conformance with the following three operational provisos,
      1. orienting the grain of all of the three veneer sheets parallel and running in the direction that will be the lengthwise dimension of the finished lumber,
      2. stagger-spacing any requisite butt joint in the veneer sheet plies from any other immediately adjacent butt joint over the range eight and one-half inches to seventeen inches,
      3. forming all interior glue bonds between a tight side of one veneer sheet ply and a loose side of an adjacent veneer sheet ply to produce a three-ply slab, one exterior surface of which exhibits a veneer sheet tight side, the other exterior surface of which exhibits a veneer sheet loose side;
   f. gluing with a cold-setting, waterproof glue, a pair of three-ply slabs from step (e) and forming the glue joint between the corresponding veneer sheet loose sides of each three-ply slab;
   g. pressing the glued three-ply slabs of step (f) until such time as the glue has set to produce a six-ply panel 1½ inches thick;
   h. ripping and cross-cutting the six-ply panel of step (g) to produce lumber of preselected width and length.

* * * * *